UNITED STATES PATENT OFFICE.

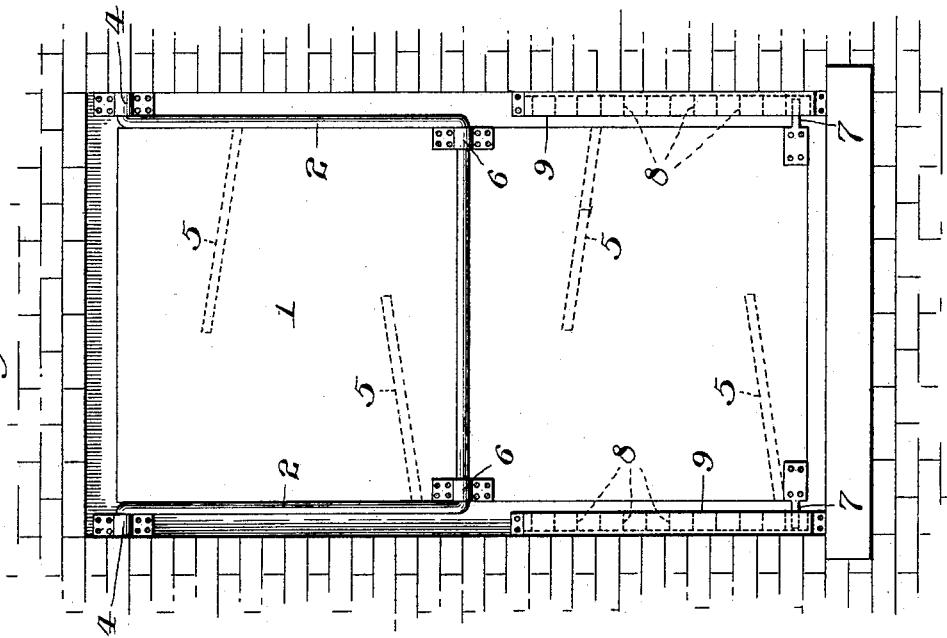

HOWARD WHITE, OF BURMONT, PENNSYLVANIA.

WINDOW-SHUTTER.

SPECIFICATION forming part of Letters Patent No. 626,449, dated June 6, 1899.

Application filed August 3, 1898. Serial No. 687,599. (No model.)

*To all whom it may concern:*

Be it known that I, HOWARD WHITE, a citizen of the United States, residing at Burmont, in the county of Delaware and State of Pennsylvania, have invented a new and useful Window-Shutter, of which the following is a specification.

My invention relates to a single shutter revolving on horizontal axes; and the objects of my improvement are to increase and regulate the amount of light admitted through the window and still accomplish the purposes of ordinary window-shutters. I attain these objects in the manner illustrated in the accompanying drawings, in which—

Figure 1 is a front view of the outside of the shutter when closed, and Fig. 2 is a sectional view from the side when the shutter is open.

Similar figures refer to similar parts in both views.

1 is a shutter closing the entire window or a portion thereof and is suspended by links 2 2. The lower ends of these links are pivoted at the sides of the shutter at 6 6 and the other ends are pivoted to the building near the upper corners of the window at 4 4. When the shutter is opened, the lower ends of the links swing out, as shown by 2 2, Fig. 2. In one case the lower corners of the shutter follow the guides 9 9 in a vertical direction, and the shutter 1, Fig. 2, is held at the desired inclination by the projections 7 7 engaging in the supports 8 8. In the other case (represented by the dotted lines forming 1' 2' in Fig. 2) the shutter moves out at the bottom on an axis at its top and is held out by a prop 3 for the purpose of shading the window.

The surface of the shutter toward the window is finished so as to act as a reflector. This may be done by painting it white or by covering it with sheets of bright metal.

The lateral gutters 5 5 on the reflecting-face of the shutter lead the rain-water off, preventing its reaching the building.

I claim as my invention and desire to secure by Letters Patent—

1. A window-shutter adjustable by turning on either of two horizontal axes; the upper axis being a fixed one near the upper portion of the window-frame, and the lower axis moving with the shutter in an arc around the upper axis; the shutter having a reflecting-face toward the window; all substantially as set forth and for the purposes specified.

2. A window-shutter with a link pivoted to the shutter between the upper and lower ends, and to the upper portion of the window-frame, the inner face of the shutter being a reflecting-face for the purposes indicated.

3. A window-shutter with a reflecting-face turned toward the room, on which face are lateral gutters, the shutter turning on a horizontal movable axis, substantially as set forth for the purposes specified.

4. An adjustable window-shutter with a reflecting-face and a link pivoted at one end to the upper portion of the window-frame and its other end pivoted between the ends of the shutter; and held in position by guides and supports at its lower corners, substantially as shown for the purposes specified.

5. A window-shutter with a link pivoted at one end to the upper portion of the window-frame and its other end pivoted between the ends of the shutter, with the inner surface of the shutter a reflector, with horizontal projections at the lower corners of the shutter and a prop from the window-frame to the lower part of the shutter, substantially as described for the purposes specified.

HOWARD WHITE.

Witnesses:
HELEN COMLY WHITE,
MARY H. WHITE.